US005283945A

United States Patent [19]

Bigelow et al.

[11] Patent Number: 5,283,945

[45] Date of Patent: Feb. 8, 1994

[54] CASSETTE OPENING SYSTEM

[75] Inventors: Donald O. Bigelow, Webster; Craig A. Caprio, Rochester; John B. Chemelli, Webster, all of N.Y.

[73] Assignee: Eastman Kodak Company, Rochester, N.Y.

[21] Appl. No.: 917,536

[22] Filed: Jul. 21, 1992

Related U.S. Application Data

[63] Continuation of Ser. No. 633,508, Dec. 28, 1990, abandoned.

[51] Int. Cl.[5] .............................................. B23P 19/04

[52] U.S. Cl. .............................. 29/806; 29/DIG. 44; 53/381.1; 53/382.1

[58] Field of Search ........................ 29/806, DIG. 44; 53/284.2, 284.4, 284.5, 381.1, 381.5, 381.6, 382.1, 382.2, 382.3; 206/455; 242/55, 71.1, 71.7; 271/107; 414/411

[56] References Cited

U.S. PATENT DOCUMENTS

| | | | |
|---|---|---|---|
| 2,194,603 | 3/1940 | Lingg et al. | 95/90.5 |
| 3,081,589 | 3/1963 | McIntyre | 53/382.1 |
| 3,104,846 | 9/1963 | Ringle | 242/71.7 |
| 3,198,418 | 8/1965 | Rupp | 229/40 |
| 3,568,587 | 3/1971 | Laual | 95/90.5 |
| 3,641,910 | 2/1972 | Smith | 95/90.5 |
| 3,662,516 | 5/1972 | Wiseman | 53/382.3 X |
| 3,691,921 | 9/1972 | Isbell | 95/31 |
| 3,768,133 | 10/1973 | Scappator et al. | 29/806 X |
| 3,921,278 | 11/1975 | Basu | 29/806 X |
| 4,239,164 | 12/1980 | Barnsbee | 242/55.53 |
| 4,354,336 | 10/1982 | Azzaroni | 53/382.1 X |
| 4,363,548 | 12/1982 | Oberhoffner | 354/298 |
| 4,420,120 | 12/1983 | Raymond | 242/71.7 |
| 4,553,369 | 11/1985 | Debes et al. | 53/382.1 X |
| 4,743,928 | 5/1988 | Young | 354/310 |
| 4,811,546 | 3/1989 | Takashima et al. | 53/382.1 X |
| 4,835,941 | 6/1989 | Torii et al. | 53/382.1 |
| 5,016,429 | 5/1991 | Kubsik et al. | 53/381.1 |

FOREIGN PATENT DOCUMENTS

| | | | |
|---|---|---|---|
| 197804 | 4/1978 | Fed. Rep. of Germany | 29/806 |
| 2-05510 | 8/1990 | Japan | 53/381.1 |

OTHER PUBLICATIONS

Huseby et al "Film Cartridge Disassembly Machine" Research Disclosure, Jul. 1981, No. 207, pp. 271-272.

*Primary Examiner*—Mark Rosenbaum
*Assistant Examiner*—Peter Dungba Vo
*Attorney, Agent, or Firm*—Charles E. Snee, III

[57] ABSTRACT

Apparatus is provided for automatically opening and removing a web from a clamshell film cassette. During opening of the cassette a first actuatable means releases a cassette latch. A second means is provided to open one clamshell half upon release of the latch, and a third means is provided to open the other clamshell half. The second and third means each include a pivotal arm having a plurality of suction cups for gripping a wall of a clamshell half. The pivotal arms are positioned by automatic actuaters. Vacuum means are provided for picking up the leading end of a web roll within the cassette and transporting it to a web path.

15 Claims, 10 Drawing Sheets 84
20°
45°
76
20°
84
45°

86
90
84
86
84
86
74
76
80
78
58
82
60
56
81
58

CASSETTE OPENING SYSTEM

This is a continuation of application Ser. No. 07/633,508, filed Dec. 28, 1990.

Cross Reference to Related Application

Reference is made to the following commonly assigned applications filed concurrently herewith:

1. Ser. No. 07/633,506 entitled "Film or Paper Cassette" filed in the names of Donald O. Bigelow, Craig Caprio and John B. Chemelli; and
2. Ser. No. 07,633,522 entitled "Film Handling System" filed in the names of Michael Long, Robert W. Sanford and Lyndon R. Huttemann.

TECHNICAL FIELD

This invention relates to photographic film handling systems and, more particularly, to a film handling system and method which can operate in a white light environment.

BACKGROUND ART

In film finishing operations, it is desirable to eliminate the need for operations personnel to work in darkroom conditions. It is also desirable to automate the film handling system to relieve operations personnel of routine manual labor and allow them to perform more important higher level functions.

It is known to use white light proof containers for photographic film and paper handling. However, such containers generally require manual removal of the film from the cassette and/or manual threading of the film into processing machinery.

DISCLOSURE OF THE INVENTION

It is an object of the present invention to provide apparatus and methods for automatically opening and removing light sensitive material from a cassette in a film finishing operation.

In accordance with one feature of the invention, a clamshell cassette containing a film roll is opened by a first actuatable means which releases a cassette latch. Second and third actuatable means are provided to open the cassette parts.

BRIEF DESCRIPTION OF THE DRAWINGS

Other features and advantages of the invention will become apparent from the following description taken in connection with the accompanying drawings wherein.

MODE OF CARRYING OUT THE INVENTION

Figure 1:
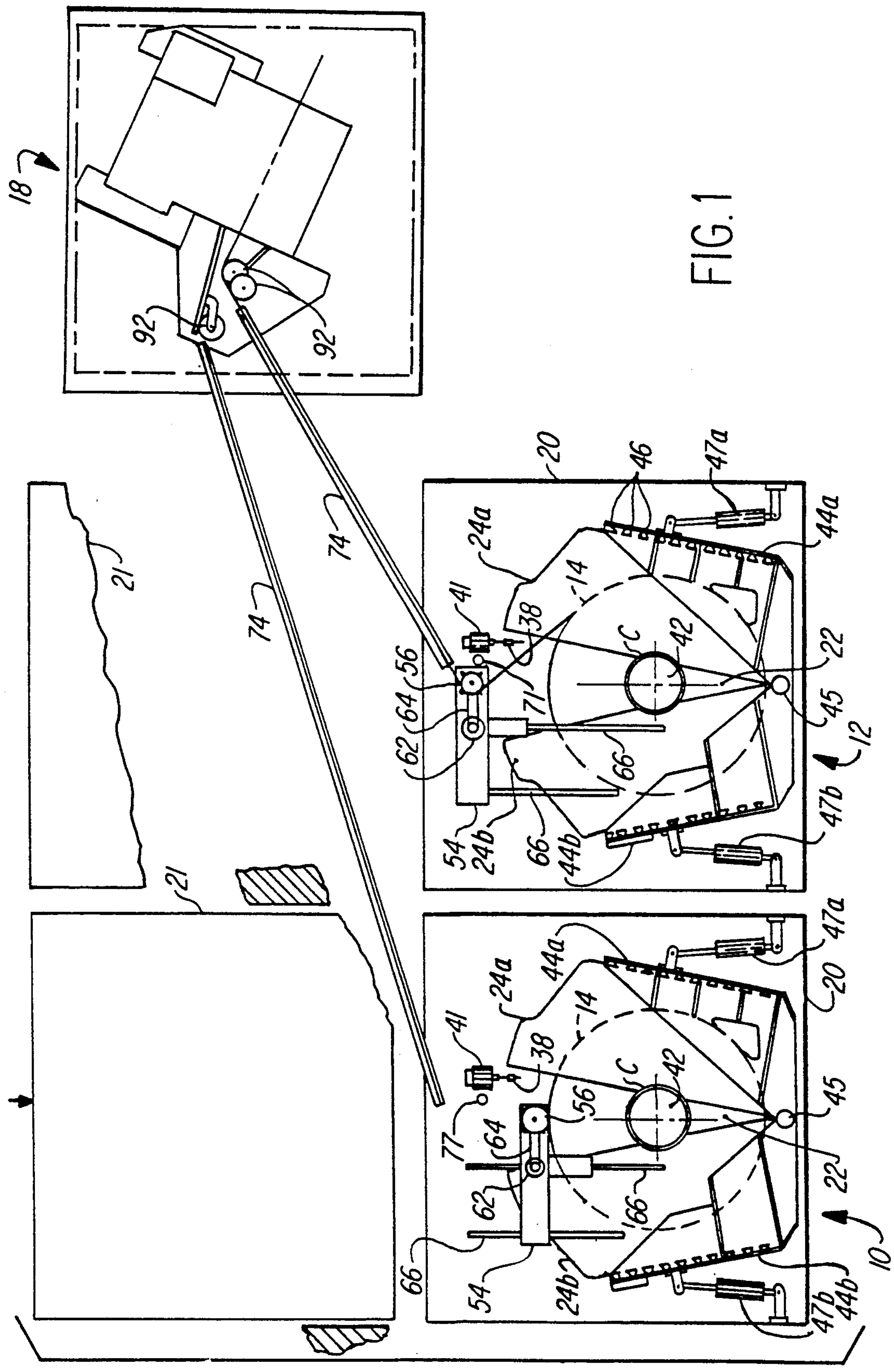
FIG. 1 is a schematic illustration of a film handling system in accordance with the invention.
Figure 1A:
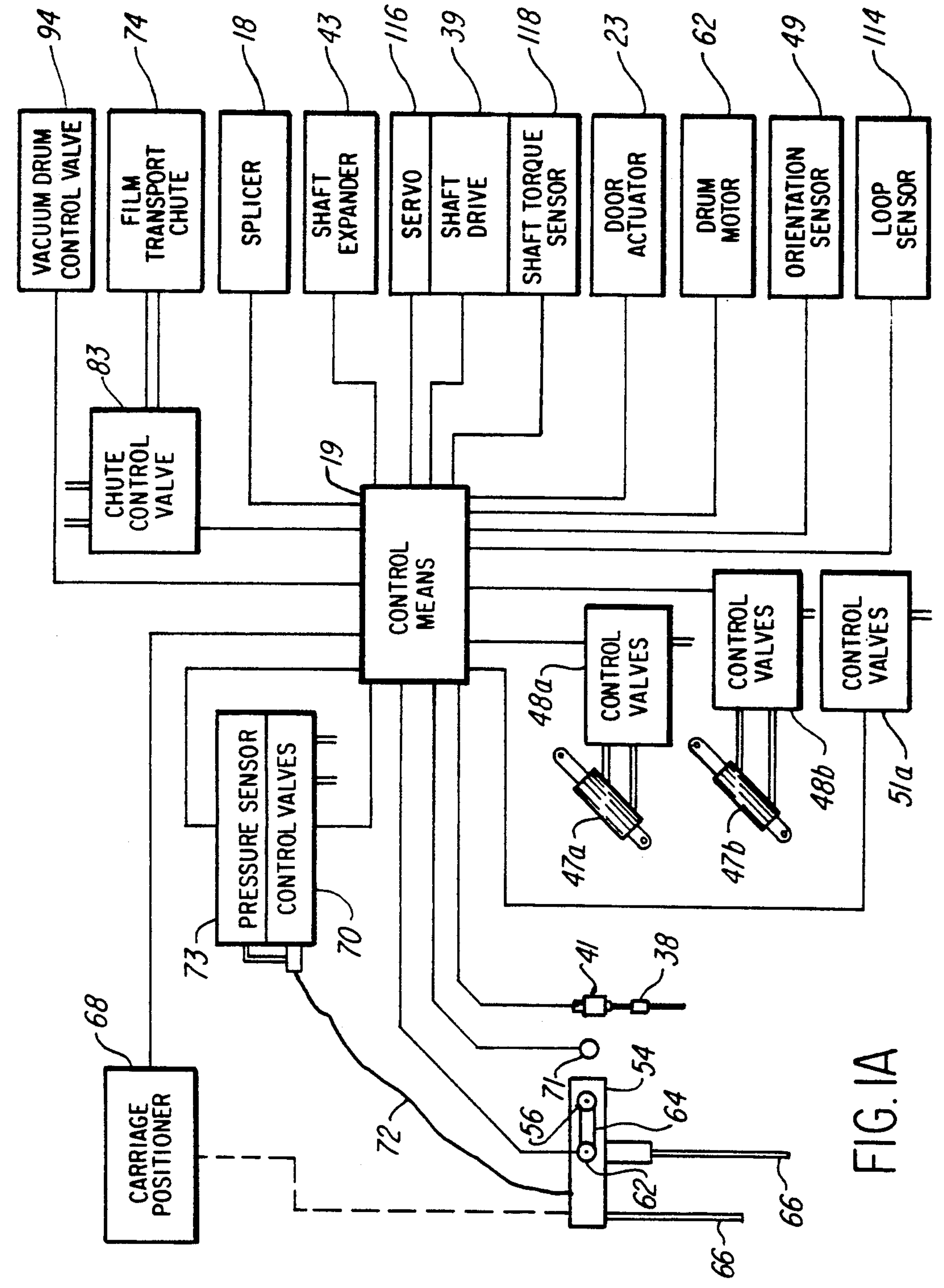
FIG. 1*a* is a schematic illustration of a portion of the system shown in FIG. 1 together with a block diagram of the control system.

Referring to FIGS. 1 and 1*a* of the drawings, there is shown a pair of film unwinding stations 10 and 12 for removing photographic film from film rolls 14 and feeding it to a film splicer and transport apparatus 18. At least two stations are provided so that one film roll can be replaced while the other is being fed to the film splicer and transport apparatus. A control means 19 (FIG. 1*a*) is provided to control the operation of each station as described below.

Each of the stations 10 and 12 are identical in construction. To simplify the disclosure, only the parts of station 12 will be disclosed and described in detail. It is to be understood that all of the parts disclosed in connection with station 12 are duplicated in station 10.

Each of the stations 10 and 12 comprises an enclosure 20 having a door 21 shown open in FIG. 1. The door 21 may be mounted on suitable guides for vertical movement and arranged to be opened and closed by a door actuator 23 (FIG. 1*a*) which may comprise, for example, a simple rack and pinion and electric drive motor activated by control means 19. When the door 21 is closed, the enclosure 20 will be light sealed.

Figure 2:
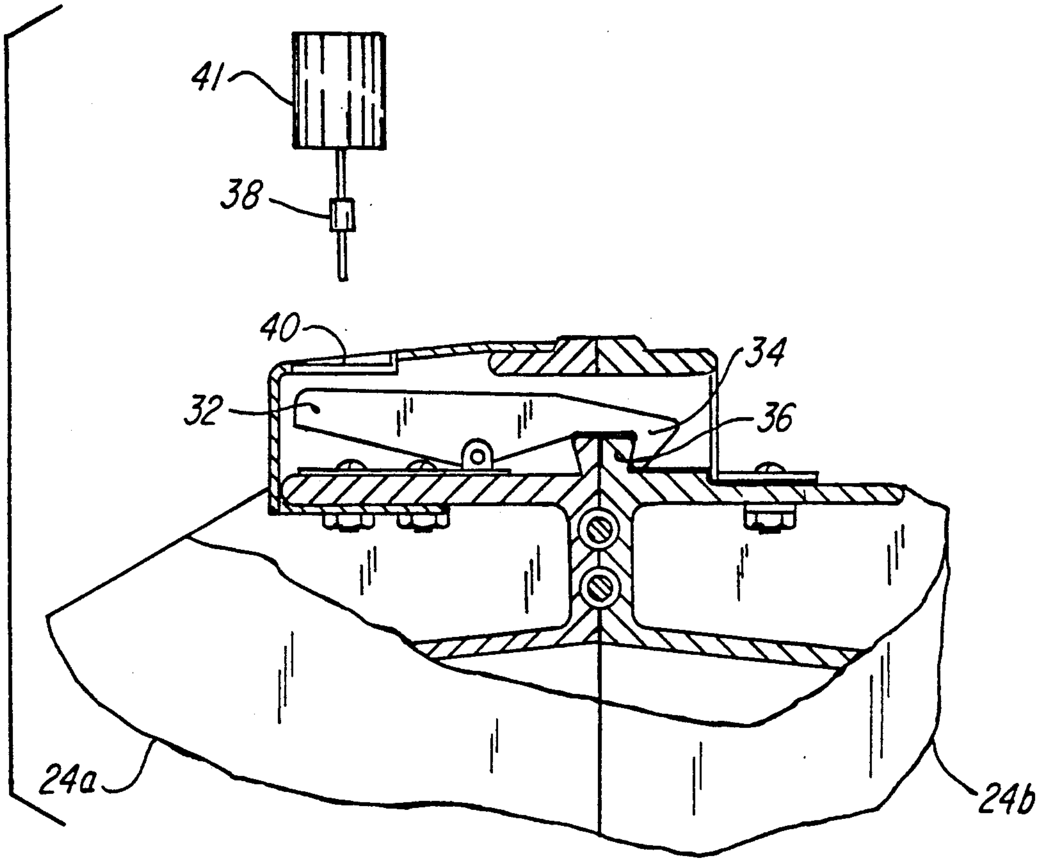
FIG. 2 is a rear view in partial section showing the construction of a cassette latch.

Each enclosure 20 is adapted to receive and support a film cassette 22 which may take the form of that disclosed in copending application Ser. No. 07/633,506 filed in the name of Donald 0. Bigelow, Craig Capria, and John B. hemelli and cross referenced above. Such application is incorporated herein by reference. As disclosed in such copending application, such a cassette includes a pair of clam shell halves 24*a* and 24*b* coupled by a hinge and provided with a latch 30 (FIG. 2). The latch 30 which is shown in detail in its closed position in FIG. 2 comprises a pivotal spring biased latch arm 32 mounted on the clam shell half 24*b* and having a hook portion 34 adapted to engage an abutment 36 on the other clam shell half 24*a*. The latch is released by inserting a shaft 38 into an opening 40 of the latch housing. A solenoid 41 adapted to be energized by control means 19 may be provided to automatically insert the shaft 38 to cause it to engage and displace the latch arm 32. Alternatively, the shaft 38 may be inserted by an air cylinder.

As disclosed in copending application Ser. No. 07/633,506 (incorporated herein by reference) the opening 40 is covered by a frangible seal which, when intact, indicates that the cassette has not been opened prior to loading into the unwinding stations. The shaft 38 will pierce this seal in releasing the latch.

The film rolls 14 are each wound on a core (c) and the trailing ends of the rolls are preferably cinched to their cores so that the film can be fully removed from the cores with automatic equipment. The core (c) is adapted to receive an expandable rotatable shaft 42 which may be rotated by a drive means 39 controlled by control means 19 to facilitate removal of the film from the roll 14. Expansion of the shaft to engage its respective core may be effected by a shaft expander 43 also controlled by control means 19.

When the clamp shell halves are closed, they clamp the core by means of the compliant rings disclosed in copending application Ser. No. 07/633,506 (incorporated herein by reference) and prevent rotation of the film roll. This feature and other features of the film cassette are more fully described in copending application Ser. No. 07/633,506 (incorporated herein by reference) and further disclosure in this application is deemed unnecessary.

Figure 9:
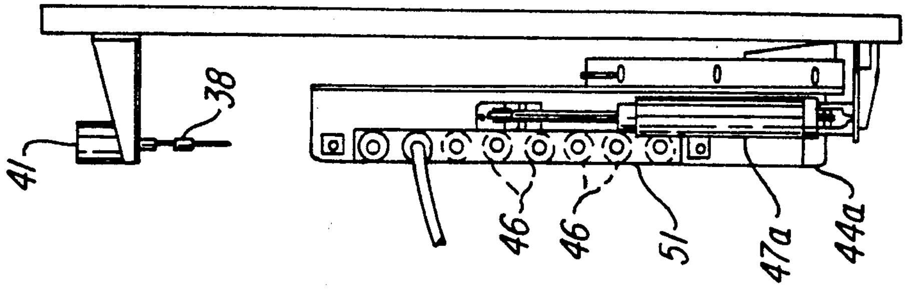
FIG. 9 is a end view of the apparatus shown in FIG. 8.
Figure 8:
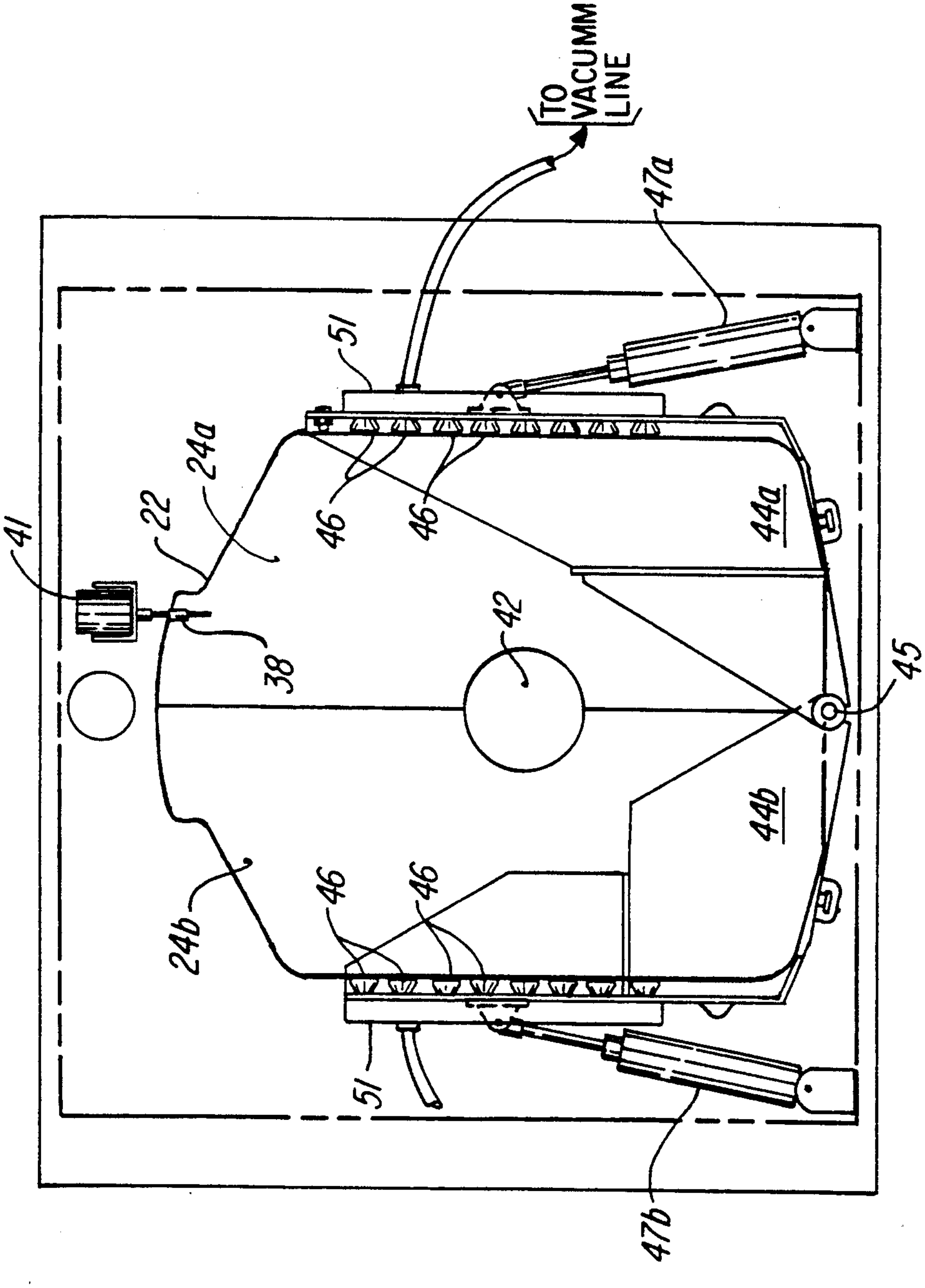
FIG. 8 is a front, view of the suction arms and arm actuators for opening a cartridge.

Referring now to the cassette opening means (FIGS. 1, 8 and 9), a pair of pivotal suction arms 44*a* and 44*b* are pivotally mounted on a shaft 45. Each suction arm has an end wall supporting a plurality of vacuum operated suction cups 46. The vacuum cups 46 are connected to manifolds 51 which are supplied with vacuum by a control valve 51*a* controlled by control means 19. Upon pivotal movement of the arms 44*a* and 44*b* toward the exterior of a closed cassette, the suction cups 46 will engage and contact the smooth end walls of the clam shell halves 24*a* and 24*b* respectively. Upon application of vacuum by control valve 51*a*, the cups 46 will grip the end walls and enable them to be positioned by arms 44*a* and 44*b*. Upon release of the latch 30 and pivotal movement of the suction arms to the positions shown in FIG. 1, the clam shell halves will be opened to free the clam shell halves from engagement with the core (c) and to permit unconstrained rotation of the film roll and shaft 43 The two suction arms 44*a* and 44*b* may be positioned by a pair of pneumatic actuators 47*a* and 47*b* (FIG. 1 and IA) connected to control valves 48*a* and 48*b* which, in response to command signals from control means 19, can selectively apply pressure to opposite sides of the pistons of actuators 47*a* and 47*b* to effect positioning of the actuators between a first position shown in FIG. 1 and a second position wherein the clam shell halves are closed. The valves 48*a* and 48*b* are activated in a predetermined sequence by control means 19 as described below.

As disclosed in copending application Ser. No. 07/633,506 (incorporated herein by reference), the housing of latch 30 is non-symmetrical in configuration relative to the clamshell halves of the cassette. This can be advantageously used to prevent nesting of the cassette and opening of the cassette by the pivotal suction arms if the cassette is not inserted with the proper orientation. Preferably, a sensor 49 (FIG. 1A) is provided to determine the location of the non symmetrical surfaces and control means 19 is programmed to prevent actuation of control valves 48*a* and 48*b* if the cassette is not properly oriented. Such a sensor may comprise an infrared, ultrasonic or mechanical sensor.

It is also apparent that if the cassette is not properly oriented the shaft 38 will not be aligned with opening 40 because of the non symmetry of the latch housing. This is a fail safe feature which insures that the latch cannot be opened if the cassette is improperly oriented.

Figures 3, 4:
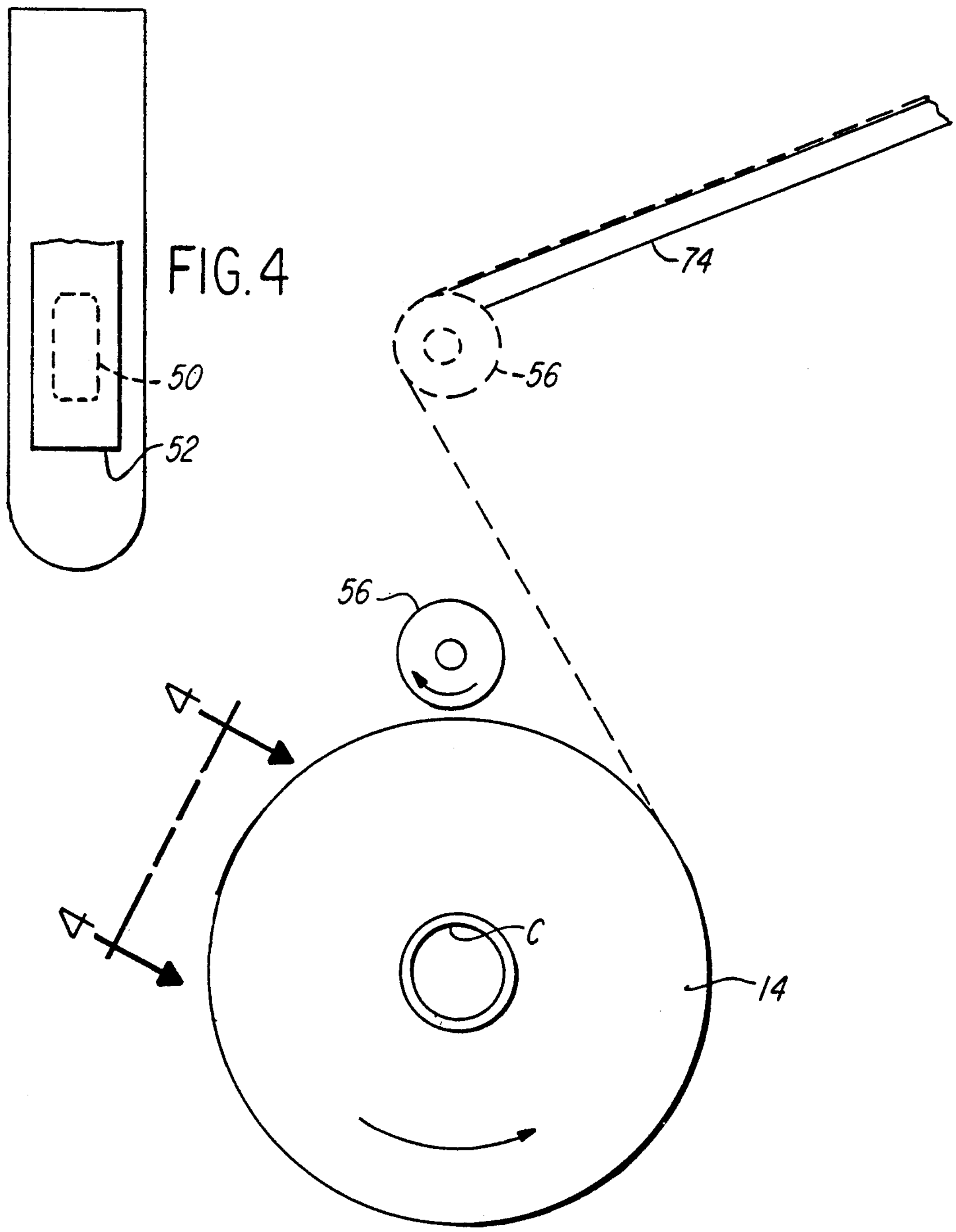
FIG. 3 is a schematic view illustrating a film roll and the positions of a film pick-up drum.
FIG. 4 is a view taken along line 4—4 of FIG. 3 showing the film leading end and adhesive retention material.

Means are provided for holding the leading end of the film on the roll 14 during storage and transport of the roll. This means comprises a rectangular opening 50 (FIG. 4) in the leading end of the film and a larger rectangular strip 52 of adhesive material covering the opening 50 and the adjacent portions of the outer convolution. The strip 52 adheres to both the outer convolution and the underlying convolution through the opening 50 to thereby retain the outer convolution to the roll, leaving the end free to be picked up by the drum described below.

Figure 5:
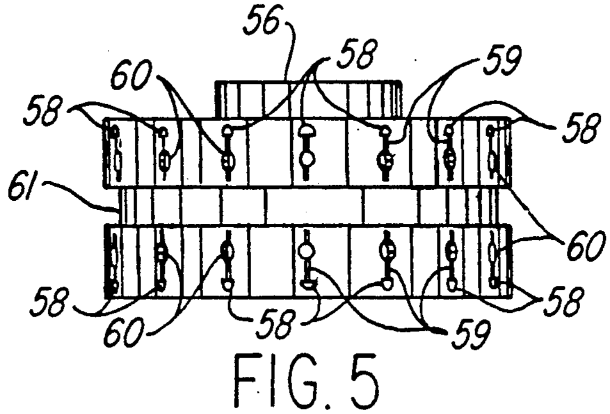
FIG. 5 is a top view of a film end pick up drum.

A film pickup means comprising a movable carriage 54 (FIG. 1) and a rotatable drum 56 are provided for picking up the leading film end from the roll 14 when the cassette 22 is open and vacuum is applied to the drum. During subsequent transport of the film, after pick up, air under pressure is applied to the drum to convert it to an air bearing, as discussed below. The carriage 54 comprises an elongated rectangular housing on which the vacuum drum 56 is rotatably mounted. As shown in FIG. 5, the drum 56 comprises an elongated cylinder having a plurality of spaced perforations 60 in its periphery for applying vacuum or air under pressure to the film. The drum also has a peripheral groove 61 for receiving a guide member as described below and a plurality of circular segment guiding holes 58 connected to the perforations 60 by surface cross grooves 59. When the drum functions as an air bearing as described below, air emitted from holes 58 guide the film. As indicated schematically in FIGS. 1 and 1*a*, the drum 56 may be rotated by an electric motor 62 supported on the carriage 54 and coupled to the drum by a belt 64.

The carriage 54 is slidably mounted on a pair of spaced elongated rods 66 for up and down movement relative to the film roll 14, such movement being effected by a carriage positioner 68 which may comprise a rack positioned by a motor driven pinion. A control valve 70 (FIG. 1*a*) connected to sources of vacuum and air under pressure is coupled to the carriage by a flexible conduit 72 to apply vacuum or pressure to the interior of the drum 56 in response to commands from control means 19.

To effect pick up of the film leader, the carriage 54 is moved to the position shown in station 10 where the vacuum drum 56 is in close proximity to the periphery of the film roll. This position is determined by a film roll proximity sensor 71 which may comprise an infrared or ultrasonic sensor for transmitting a signal representative of the linear distance between drum 56 and the periphery of the film roll to control means 19. Control means 19 will respond to this signal to position carriage 54 in close proximity to the periphery of the roll. Preferably, the spacing between the vacuum drum and roll periphery will be approximately .08 inches plus or minus .03 inches, the spacing being dependent on factors such as media type and length of the leader free end. When the drum 56 is so positioned, the drum is rotated clockwise and the roll is rotated counterclockwise by control means 19 until the vacuum applied to the roll by means of the drum picks up the free leader end and retains it on the drum. Vacuum in the drum causes the film end to be drawn towards the drum. The drum picks up the free leader beyond the material 52 at the film end and effectively subjects the adhesive bond between the adhesive material 52 and the underlying web convolution to peel, its weakest failure mode, while using vacuum force to its greatest advantage in shear. Upon such pickup of the film end, a pressure sensor 73 will detect a change in vacuum at the outlet of control valve 70 and transmit a signal to control means 19. In response to the sensed change in pressure, control means 19 will cause the drum to be rotated approximately one-half revolution more to position the film end on the upper side of the drum. The carriage positioner 68 will then be activated by control means 19 to raise the carriage to the position shown in station 12 where it is in close proximity to a film transport chute 74. In the upper position of the carriage, the drum will be rotated further clockwise to feed the end of the film into the end of chute 74.

Upon pick up of the film end by the drum, the control means 19 will cause shaft drive means 39 to apply a constant torque rotational force to shaft 42 tending to urge it in a clockwise direction to maintain a predetermined tension in the film. Such urging tends to oppose the counterclockwise rotation of the shaft during removal of the film to prevent clockspringing of the film roll.

Figures 6, 7:
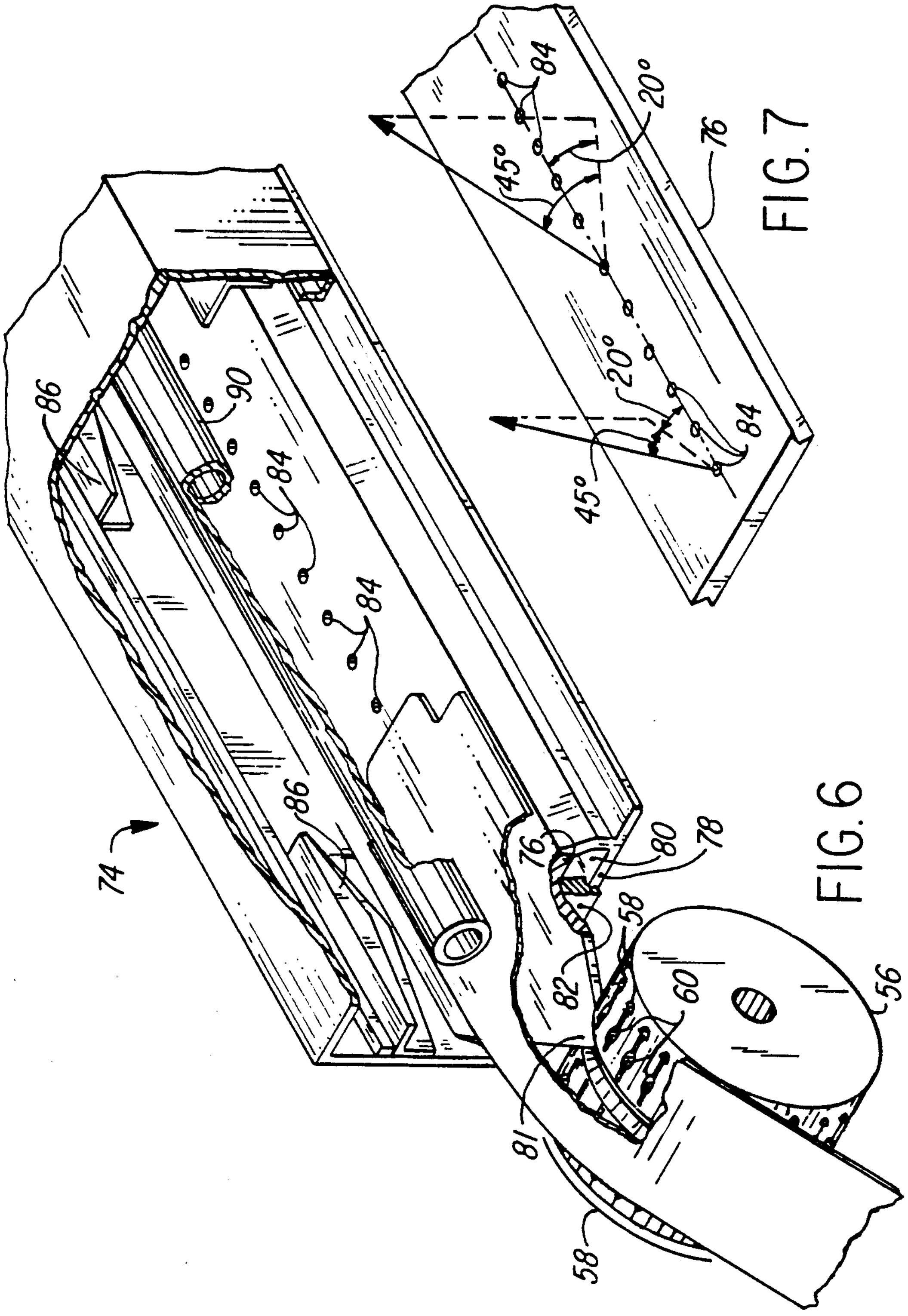
FIG. 6 is a perspective view of a film transport chute with portions cut away to illustrate the interior construction.
FIG. 7 is a perspective view of the air track surface showing the, angular orientations of the air ports.

Referring to FIGS. 6 and 7, the transport chute 74 comprises an elongated housing having a rectangular cross section. An inner wall 76 extending the full length of chute 74 in spaced relationship with the outer bottom wall 78 to define with the bottom wall a pressure chamber 80 sealed at its ends by end plugs 82. As shown most clearly in FIG. 6, the wall 76 is provided with an extending finger 81 adapted to be received in the central groove of the drum 56 to facilitate the transfer of the film to the drum.

A series of air ports 84 are formed in the wall 76 over its entire length. The ports 84 each extend through the wall 76 on an axis inclined approximately 45 degrees relative to the plane of wall 76 to discharge air upwardly through the chute. In addition, each port is inclined approximately 20 degrees relative to the longitudinal axis of the wall 76 with alternate ports alternating 20 degrees left and right of center, as shown in FIG. 6. In a preferred embodiment, the holes are 0.0225 inches in diameter and are spaced by 0.33 inches.

The chamber 80 is connected to a source of air under pressure by a control valve 83 and is pressurized between one and twelve PSI when the valve is open. The upper surface of wall 76, in combination with a plurality of spaced edge guides 86 attached to the sidewalls of the chute, define an air track for the film. The guides 86 are tapered in both width and height to allow broad tolerances for axial web placement at the entrance of the chute, while tightly controlling the web position tolerance at the exit of the chute. This feature allows controlled thread up despite telescoped rolls or misplaced taped down film ends.

To complete the chute assembly, a tubular air baffle 90 extends the length of the chute above the longitudinal axis of wall 76 to redirect waste air to help uncurl the film. Also, if the film end attempts to curl it will engage the baffle 90 which will restrict its movement and limit the extent of the curl.

In operation of the chute, the ports 84 will emit air at a 45 degree angle to the direction of film travel. Alternate ports emit air at 20 degree angles, left and right, from the longitudinal axis of the film. This angled air flow will create an air cushion and an air pressure driving force which suspends the film and propels it through the chute without contact with chute surfaces other than the edge guides.

After the drum 56 picks up the film end and feeds it into the chute, it will continue to rotate to meter film up the chute until the film is received by the vacuum drum 92 of the splicer 18 described below. Upon such receipt, the vacuum drum 92 will meter film into the splicer where it will be held for splicing. The control means 19 will then receive a splice ready signal from splicer 18 and will activate control valves 70 and 94 to supply air under pressure to the interior of the drums 56 and 92 respectively. The air emitted by the drum ports will now provide an air bearing permitting movement of the film around the drums 56 and 92 on a cushion of air and guided laterally by jets of air issuing from the edge guides 58 of the drum.

It is to be noted that during the entire process of picking up the film end, threading it into the chute and transporting it through the chute, nothing contacts the emulsion side of the film which faces the inside of the film roll. As the film is picked up by drum 56, the emulsion is on the side facing away from the drum. Likewise, the emulsion side is on the upper side of the film when it is being propelled through the chute 74.

Figure 11:
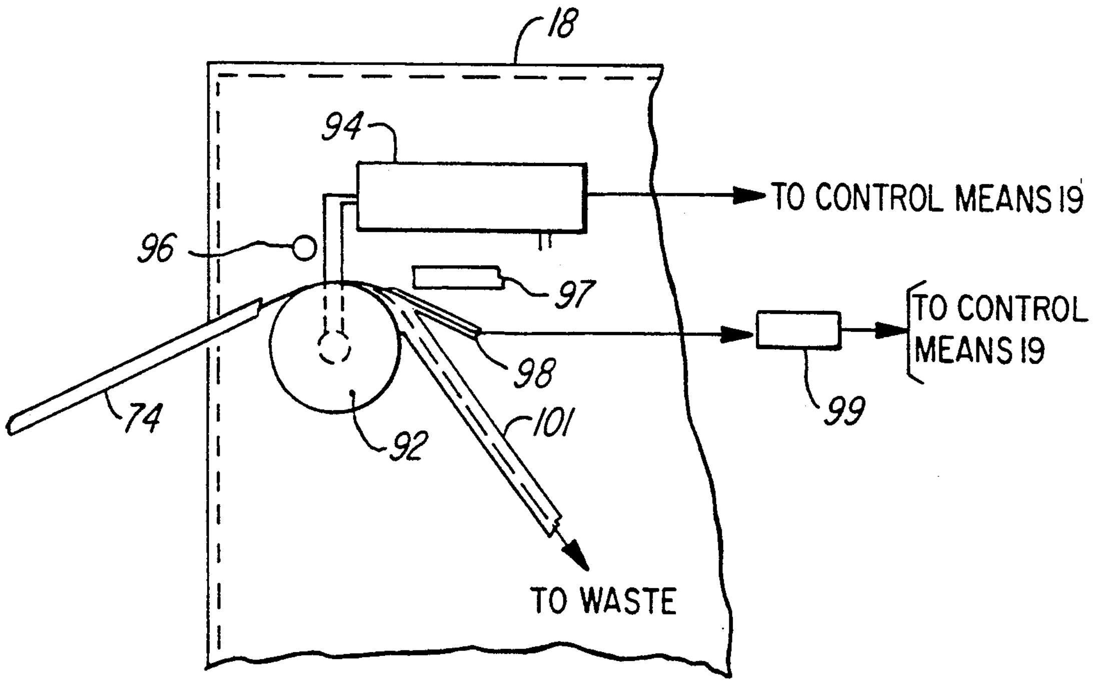
FIG. 11 is a schematic illustration of the splicer film input section.

From each chute, the film is transported into the film splicer 18 by a vacuum drum 92 (FIG. 11), connected to a vacuum source. A control valve 94 controlled by control means 19 may be associated with drum 92 to apply vacuum to the interior of the drum. A sensor 96 is provided to sense the presence of film in position for splicing and to transmit a film presence signal to the control means 19. The control means 19 responds to this signal to actuate valve 94 to apply air under pressure to drum 92 to convert it to an edge guiding air bearing. Once a splice is initiated by the splicer and the film end is firmly spliced to the film going into the vacuum box described below, the control means will also transfer the shaft drive means from its constant torque mode to the loop position servo mode described below.

Similar to drum 56, the drum 92 (FIG. 11) may be provided with edge guide holes (not shown) and a center groove (not shown), the latter receiving a bridging finger on the upper end of chute 74 (not shown) identical to that on the lower end of the chute. The drum 92 is arranged to feed film into an input chute 97 to the splicing mechanism by means of a guide 98 which is retractable by a solenoid 99 coupled to control means 19 to permit feeding of film into a waste chute 101. A cutter (not shown) controlled by control means 19 may be provided to cut the film when guide 98 is retracted. As described below, the guide 98 is retracted to permit waste film to be directed into chute 101 upon depletion of the film roll. Alternatively, the feeding of the film into chutes 97 and 101 may be controlled by an air gland arranged to establish vacuum in selected regions of the drum 92.

In operation of the splicer, control means 19 will initially activate control valves 94 during start up to apply vacuum to the drum 92. When the film is received by the drum 92, it will be guided into chute 97 by guide 98 and directed to the splicing mechanism (not shown) and held there. The sensor 96 will sense the presence of the film and send a signal to control means 19. Control means 19 will activate control valve 94 to convert drum 92 to an edge guiding air bar. After a splice is made the control means 19 will transfer drive means 39 and servo system 116 from the constant torque shaft 42 driving mode to the loop position servo mode described below.

From splicer 18, the film is transported to a vacuum box 100 and then to film treating apparatus such as a film perforator 102. The vacuum box 100 functions in a manner well known in the art to maintain a tensioned film loop between the splicer and perforator. For the purpose of illustrating a typical film handling system, the vacuum box has been shown in its most simple form as a single loop box. However, as will be apparent to those skilled in the art, the vacuum box may comprise a series of such boxes or boxes of varying geometry for providing a series of loops depending on the capacity of associated apparatus.

Figure 10:
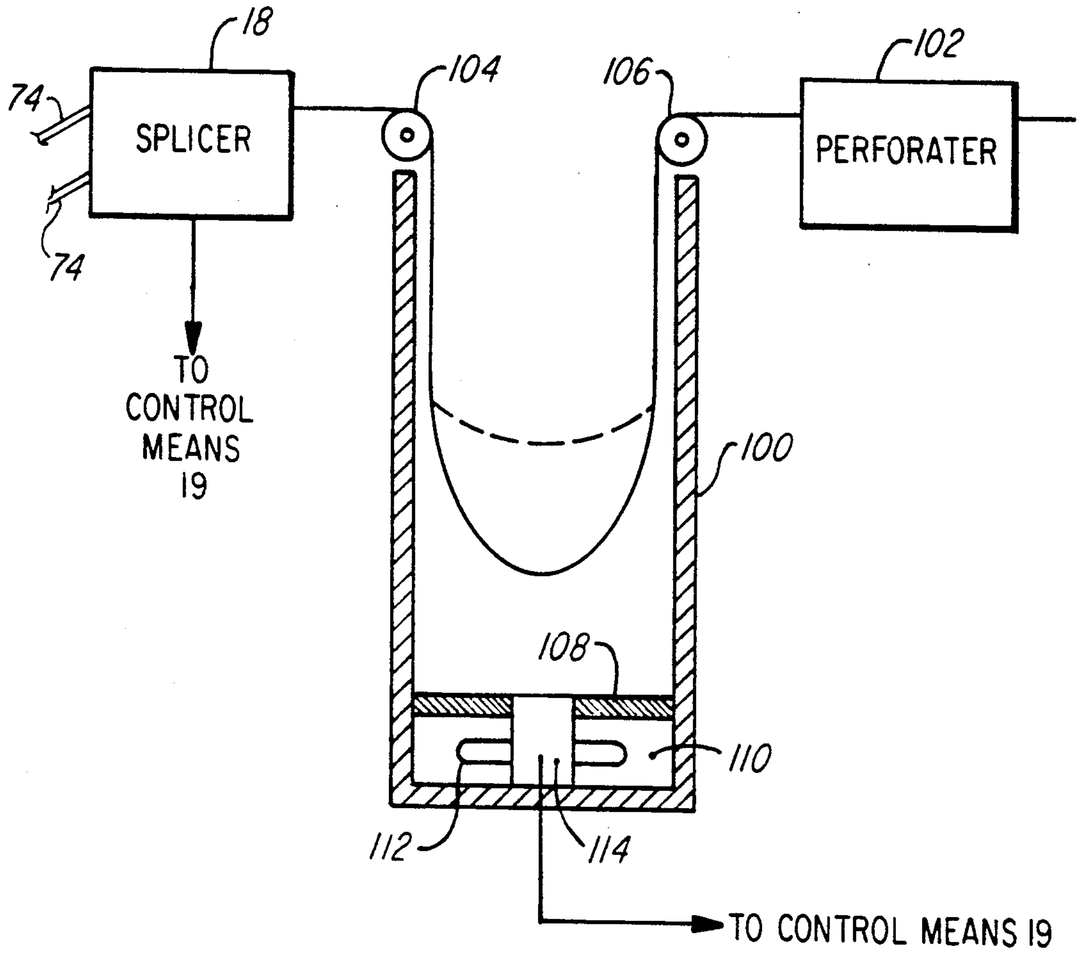
FIG. 10 is a schematic illustration of a film vacuum box, splicer and perforator.

Referring more specifically to the box 100, film is transported into and out of the box over rollers 104 and 106 which may comprise air bearings supplied with air under pressure. To maintain the desired loop configuration, vacuum is supplied to the outer surface of the film loop through a mesh plate 108 covering a vacuum chamber 110 which has an inlet 112 coupled to a vacuum pump (now shown). A loop height sensor 114, which may comprise an ultrasonic sensor of a type well known to those skilled in the art, is coupled to control means 19. The loop sensor 114 generates signals representative of loop height which are transmitted to a servo motor control system 116 associated with shaft drive means 39. The control means 19 and servo system 116 will control drive means 39 to maintain the loop between a lowermost position shown in FIG. 10 and an upper position indicated by the dashed lines in FIG. 10. When the loop reaches the upper positions, drive means 39 will be activated to increase the film delivery rate into the box. When the loop reaches the lower position, the drive means will be activated to decrease the film delivery rate.

Referring now to the shutdown functions, a torque sensor 118 is associated with drive means 39 to sense the torque applied to shaft 42. When the sensed torque drops to zero in response to depletion of the film roll on core (c), the torque sensor will send a signal to control means 19 which will respond by deactivating shaft drive means 39 and sending a command signal to splicer 18 to make a splice with the end of the other film roll in station 10. Guide 98 will be retracted by solenoid 99 and the waste film between the splice and the end of the film will be directed into the waste chute 101 within the splicer by the input vacuum drum of the splicer.

Figure 12:
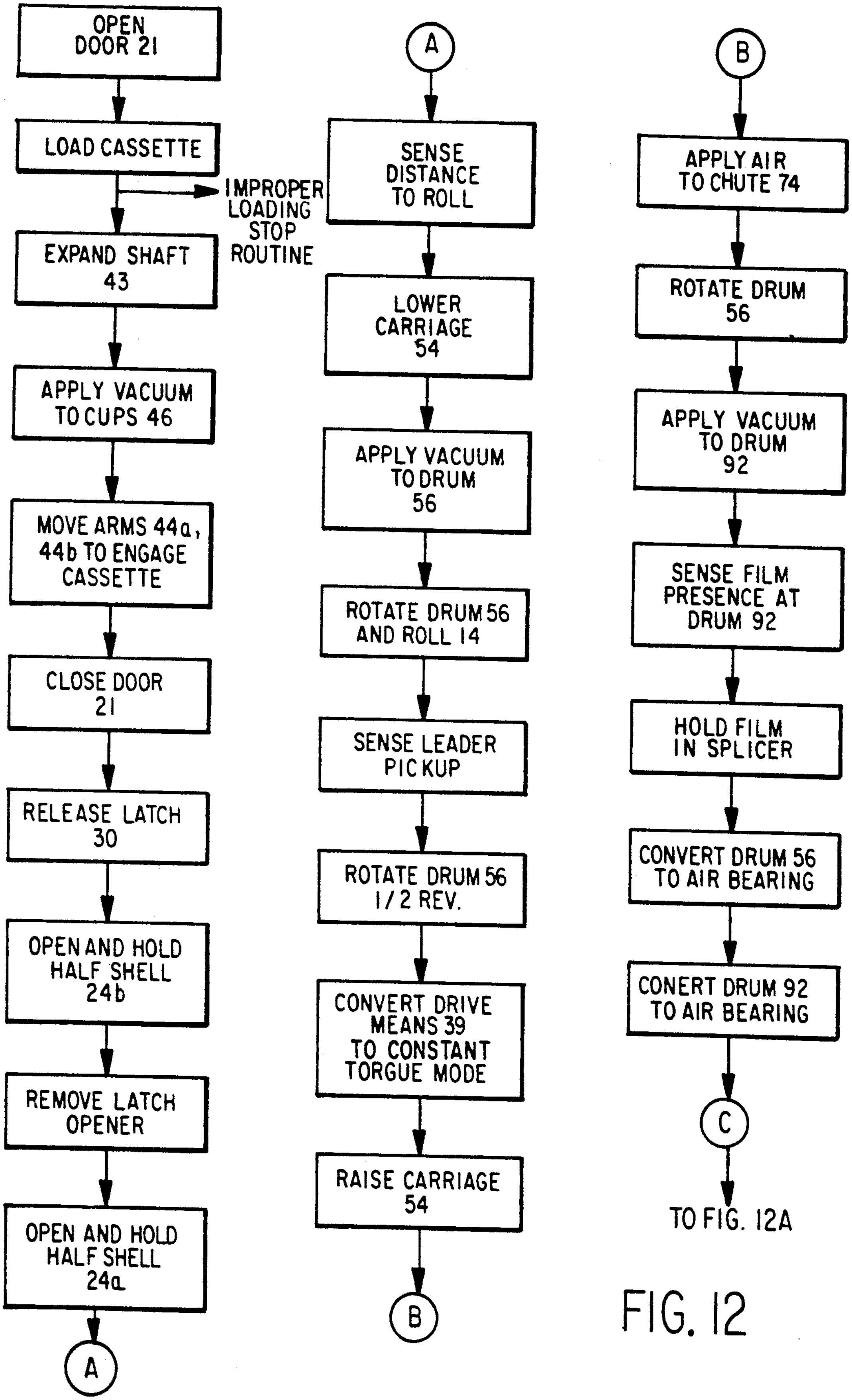
FIG. 12 is a flow diagram illustrating the operating routine of the film handling system.
Figure 12A:
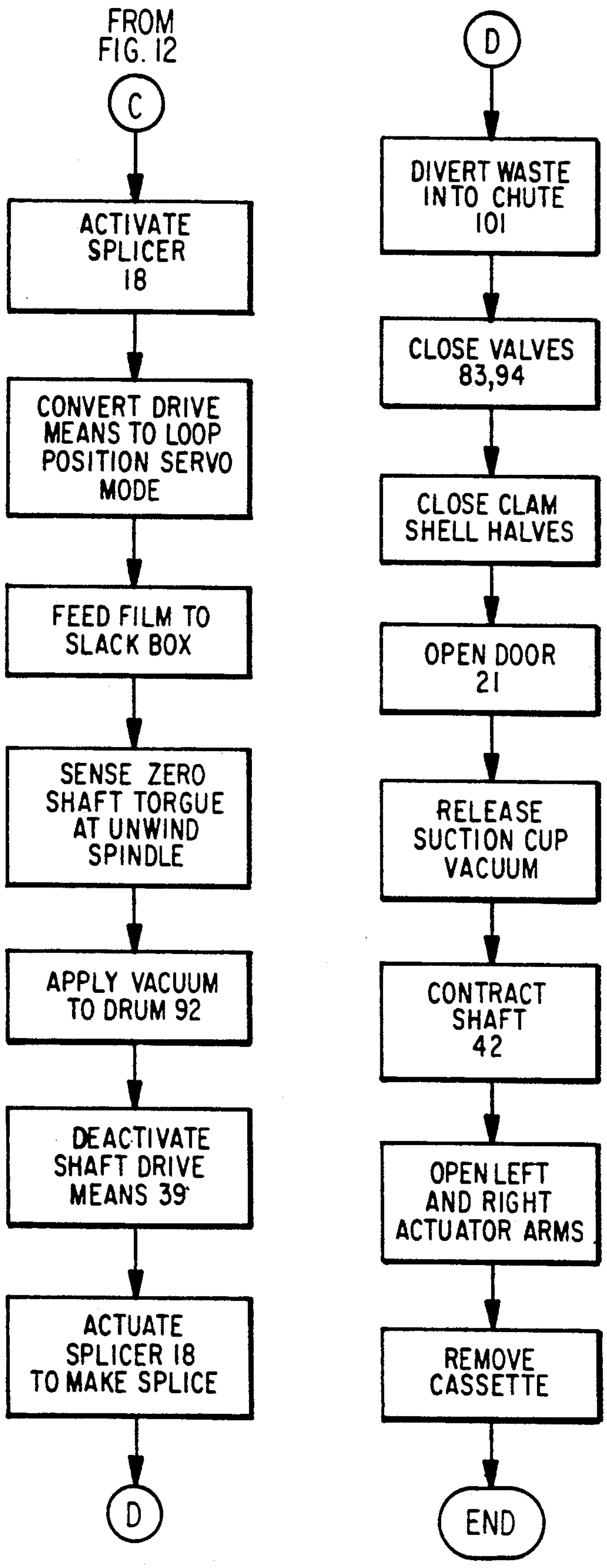

To summarize the operation of the film handling system reference is made to the operating routine depicted in FIG. 12. As indicated in FIG. 12, the door 21 of station 12 is initially opened by control means 19 and the cassette 22 is loaded into the enclosure 20 with its core 42 on shaft 43. Such loading, as well as unloading, may be accomplished manually or automatically using a robot (not shown).

After such loading, orientation sensor 19 will determine whether the cassette is properly oriented. If the orientation is correct, control means 19 will next activate shaft expander 43 to expand the shaft 42. Next the control means will activate control valve **51*a* to apply vacuum to suction cups 46. The control means 19 will then actuate valves 48*a* and 48*b* to supply air under pressure to actuators 47*a* and 47*b* to cause the arms 44*a* and 44*b* to engage the clam shell halves. The control means 19 will then activate door actuator 23 to close the door 21 to light seal the enclosure. The control means 19 will next energize the solenoid 41 to cause the shaft 38 to pierce the frangible material and release latch 30. The control means 19 will then actuate control valve 48*b* to apply pressure to the actuator 47*b* associated with cassette half shell 24*b* to open half shell 24*b*. The control means 19 will then deenergize the solenoid 41 to remove the shaft 38 from the latch 30. After removal of the shaft 38 from the latch, the control means 19 will actuate valve 48*a* to apply pressure to actuator 47*a* and open clam shell half 24*a*. The clam shell halves will now be in the position shown in FIG. 1 and the core 42 will be free of the cassette to be rotatable by the shaft 43**.

The control means 19 will next activate sensor 71 to determine the distance to the periphery of the roll 14. It will then activate the carriage positioner 68 to lower carriage 54 from its upper position to the lowermost position wherein vacuum drum 56 is positioned in close proximity to the roll, such position being determined by the roll proximity sensor 71 and control means 19. When the carriage is so positioned, the control means 19 will open control valve 70 to apply vacuum to the interior of the drum and energize motor 62 to effect rotation of the drum 56 in a clockwise direction. Simultaneously, control means 19 will activate the shaft drive means 39 to effect counterclockwise rotation of the roll 14. When the roll leading end becomes positioned below drum 56, the vacuum will lift the film end and cause it to transfer and wrap on the vacuum drum. The traction force of the film against the vacuum drum will then peel the taped down portion of the leader away from the underlying convolution.

Upon pick up of the film end, the pressure sensor 73 will transmit a signal to control means 19 which will then convert shaft drive means 39 to the constant torque mode described above. Motor 62 will continue to rotate drum 56 in a clockwise direction for approximately ½ revolution. When the film end reaches a position on the vacuum drum for threading into the chute 74, control means 19 will hold the rotational position of motor 62 temporarily and activate carriage positioner 68 to raise carriage 54 to its uppermost position where the film end is positioned in close proximity with the end of the chute 74. Control means 19 will now energize motor 62 to rotate drum 56 to feed the film end into the chute 76 and open chute control valve 83 to supply air under pressure to the chute 74. Also, the control means 19 will open control valve 94 to apply vacuum to drum 92. The jets of air in the chute will support the web and propel it forward without contact with surfaces other then the edge guides within the chute. When the film end reaches the upper end of the chute, it will be transported into splicer 18 by drum 92 and held there.

When the film is received by the drum 92, sensor 96 will transmit a signal to control means 19. Splicer 18 will hold the film in a position to be spliced. Control means 19 will also respond to the signal from sensor 96 to activate control valves 70 and 94 to apply air under pressure to drums 56 and 92 to convert them to edge guiding air bearings. When a web roll is depleted, control means 19 will activate splicer 18 to splice the leading end of the film to the trailing end of the preceding strip. Control means 19 will then activate servo 116 and shaft drive 39 to convert the shaft drive from its constant torque mode to its loop position servo mode.

When the film is depleted in the unwind station that had been supplying film prior to the splicing, its torque sensor 118 will sense the resulting zero shaft torque and transmit a shut down signal to control means 19, deactivate shaft drive means 39, activate guide 98 to divert the remaining film waste into chute 101, close control valves 83, 94, activate valves **48*a* and 48*b* to supply pressure to actuators 47*a* and 47*b* to close the cassette, activate control valve 51*a* to vent vacuum from manifolds 51, open right and left actuator arms 44*b* and 44*a*, activate shaft expander 43 to contract shaft 42. The door actuator 23 will also be activated to open door 21**. The cassette may now be removed from the unwind enclosure.

It will be appreciated that the entire process of opening the cassette and threading film into the splicer is accomplished automatically without operator assistance. It will also be apparent that the dual unloading stations 10 and 12 permit one station to be serviced or reloaded with a new cassette and film roll, while the other station is dispensing film to the splicer.

It is to be understood that the invention is also applicable to the handling of photographic paper. Also, features disclosed herein have applicability to the handling of non light sensitive web material.

Those skilled in the art to which the invention relates will appreciate that other substitutions and modifications can be made to the described embodiment without departing from the spirit and scope of the invention as described by the claims below.

We claim:

1. Apparatus for automatically opening a cassette having at least two separable parts and for removing a web wound on a roll contained within the cassette, the cassette having a releasable latch retaining the parts in the closed position, said apparatus comprising:
- first actuatable means for releasing the latch;
- second actuatable means for moving one of the cassette parts from said closed position to an open position;
- third actuatable means for moving the other of the cassette parts from said closed position to an open position;
- fourth means for picking up the leading end of the web wound on said roll and transporting it to a remote location; and
- fifth means for actuating said first means to release the latch, said second and third means to open the cassette parts, and said fourth means to pick up and transport the web end.

2. Apparatus as claimed in claim 1 wherein each of said second and third means comprises suction means for gripping a cassette part.

3. Apparatus as claimed in claim 1 or 2 wherein said fourth means comprises vacuum means.

4. Apparatus as claimed in claim 3 wherein each of said suction means comprises:
- a pivotal arm; and
- a plurality of suction cups on said arms for gripping a wall of a cassette part.

5. Apparatus for automatically opening a cassette having at least two separable parts and for removing a web wound on a roll within the cassette, the cassette having a latch including a latch member on one cassette part engageable with an abutment on the other cassette part, the latch including a housing enclosing the latch member and abutment and including an opening for insertion of a tool for releasing said latch member to open the cassette, said apparatus comprising:
- first actuatable means for inserting the tool into said opening to release the latch member and for removing the tool after the latch member is released;
- second actuatable means for moving the other cassette part to an open position;
- third actuatable means for moving the one cassette part to an open position;
- fourth actuatable means for picking up the leading end of the web and transporting it to a remote location; and
- control means for sequentially actuating said first means to release the latch member, said second means to open the other cassette part, said first means to remove the tool from the opening, said third means to open the one cassette part and said fourth means to pick up and transport the web end.

6. Apparatus as claimed in claim 5 wherein said second and third means each comprise suction means for gripping a surface of a cassette part.

7. Apparatus as claimed in claim 6 wherein each of said suction means comprises:
- a pivotal arm; and
- a plurality of suction cups on said arm for gripping a wall of a cassette part.

8. Apparatus as claimed in claim 7 wherein said second and third means further includes pneumatic means for positioning said pivotal arms.

9. Apparatus for automatically opening a cassette having at least two pivotally connected parts and for removing a web wound on a roll contained within the interior of said pivotally connected parts of the cassette, said apparatus comprising:
- a pair of movable members positioned adjacent said pivotally connected cassette parts;
- at least one suction cup on each of said movable members engageable with exterior surface of the respective adjacent cassette part;
- means for moving said movable members toward said pivotally connected cassette parts respectively to cause said suction cups to engage and grip the exterior surface of said pivotally connected cassette parts respectively;
- means for moving said movable members away from the cassette parts while the cassette parts are engaged and gripped by said suction cups to pivotally displace and separate the cassette parts respectively; and
- means for removing the web from the roll after separation of the cassette parts and transporting it to a remote location.

10. Apparatus as claimed in claim 9 further including a shaft, said members being pivotally mounted on said shaft for pivotal movement toward said cassette parts to position the suction cups into engagement with the cassette parts respectively.

11. Apparatus as claimed in claim 10 wherein said means for moving said members comprise pneumatic actuators.

12. Apparatus as claimed in claim 9 wherein said means for removing the web comprises vacuum means.

13. Apparatus for opening a cassette having at least two pivotally connected parts and for removing a web wound on a roll contained within the interior of said pivotally connected parts of the cassette, the cassette having a releasable latch for retaining the pivotally connected cassette parts in a closed condition, said apparatus comprising:
- a pair of movable members positioned adjacent said pivotally connected cassette parts;
- at least one suction cup on each of said movable members engageable with exterior surface of the respective adjacent cassette part;
- means for releasing the latch;
- means for moving said movable members toward said pivotally connected cassette parts respectively to cause said suction cups to engage and grip the exterior surface of said pivotally connected cassette parts;
- means for moving said movable members in a direction away from the cassette parts while the pivotally connected cassette parts are engaged and gripped by sad suction cups to separate the pivotally connected cassette parts.

14. Apparatus as claimed in claim 13 further including:
- means for removing the web from the roll after separation of the cassette parts.

15. Apparatus as claimed in claim 14 wherein said means for removing the web comprises vacuum means.

* * * * *